US00RE36597E

United States Patent [19]

Agar et al.

[11] E Patent Number: Re. 36,597

[45] **Reissued Date of Patent: *Mar. 7, 2000**

[54] APPARATUS AND METHOD FOR MEASURING TWO- OR THREE-PHASE FLUID FLOW UTILIZING ONE OR MORE MOMENTUM FLOW METERS AND A VOLUMETRIC FLOW METER

[75] Inventors: Joram Agar, Grand Cayman, Cayman Islands; David Farchi, Bellaire, Tex.

[73] Assignee: Agar Corporation Inc., Houston, Tex.

[ * ] Notice: This patent is subject to a terminal disclaimer.

[21] Appl. No.: 08/969,619

[22] Filed: Sep. 25, 1997

Related U.S. Patent Documents

Reissue of:

[64] Patent No.: 5,461,930
Issued: Oct. 31, 1995
Appl. No.: 07/852,554
Filed: Mar. 17, 1992

[51] Int. Cl.[7] ..... G01F 1/74

[52] U.S. Cl. ..... 73/861.04

[58] Field of Search ..... 73/861.04, 195, 73/861.27, 861.44

[56] References Cited

U.S. PATENT DOCUMENTS

| | | | |
|---|---|---|---|
| 3,488,996 | 1/1970 | Pfrehm | 73/61.1 |
| 4,050,896 | 9/1977 | Raffel et al. | 23/195 |
| 4,168,624 | 9/1979 | Pichon . | |
| 4,236,406 | 12/1980 | Reed et al. | 73/861.04 |
| 4,503,383 | 3/1985 | Agar et al. | 324/61 |
| 4,604,902 | 8/1986 | Sabin et al. . | |
| 4,640,902 | 2/1987 | Sabin et al. | 73/861.04 |
| 4,760,742 | 8/1988 | Hatton | 73/861.04 |
| 5,551,305 | 9/1996 | Farchi et al. | 73/861.04 |

FOREIGN PATENT DOCUMENTS

| | | |
|---|---|---|
| 1.487.394 | 7/1967 | France . |
| 438505 | 12/1926 | Germany . |
| 56-125621 | 2/1981 | Japan . |
| WO91/15738 | 10/1991 | WIPO . |

OTHER PUBLICATIONS

International Journal of Multiphase Flow, vol. 8, No. 1, 1982, pp. 33–46, J. Reinann, et al., "Measurements Of Two–Phase Mass Flow Rate: A Comparision Of Different Techniques".

The Chemical Engineer, Oct. 1988, pp. 39–45, R. Baker, "Measuring Multiphase Flow".

AGA Gas Measurement Manual, Chapter IV, "Orifice Meters," pp. 41–85, 1 st ed. (1963).

*Primary Examiner*—Richard Chilcot
*Assistant Examiner*—Jewel V. Thompson
*Attorney, Agent, or Firm*—Rosenblatt & Redano P.C.

[57] ABSTRACT

An apparatus and method for measuring the flow rates of each component of two-phase flow consisting of a gas and a liquid or three-phase flow consisting of water, oil and gas, including a first volumetric flow meter stage, and second and third momentum flow meter stages coupled in a series flow path with the volumetric flow meter stage and in which a velocity ratio between the gas and the liquid in the series flow path is maintained to be one. A processor calculates flow rates of the components of flow by solving volumetric flow and momentum or energy equations defining flow through the first through third stages utilizing a volumetric flow output from the first stage and momentum flux outputs from said second and third stages, and an indicator displays flow of liquid and gas or oil, water and gas components of the flow. To measure three-phase flow, a water-cut meter is provided to determine the amount of water flow, which is then used by the processor to determine the flow of the rest of the liquid. The second and third momentum flow meter stages can be implemented by two separate momentum flow meters or by a single momentum flow meter, such as a venturi flow meter having a venturi nozzle including pressure taps for obtaining at least two differential pressure measurements. In the event that the density of the liquid component is known, a single momentum flow meter stage is sufficient.

25 Claims, 5 Drawing Sheets

APPARATUS AND METHOD FOR MEASURING TWO- OR THREE-PHASE FLUID FLOW UTILIZING ONE OR MORE MOMENTUM FLOW METERS AND A VOLUMETRIC FLOW METER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to-an apparatus and method for measuring two-phase flow (liquid/gas) or three-phase flow (liquid/liquid/gas) of fluids.

2. Discussion of Background

The measurement of oil, water and gas flow finds application in various fields. In oil production, it is required for reservoir control and fiscal reasons. High accuracy of measurement is necessary as well as small instrumentation space requirements. Additional applications exist in petrochemical, nuclear and other industries.

In the past, three principal methods have been utilized for flow measurements.

As disclosed in U.S. Pat. No. 4,760,742, the gas in a liquid is physically separated from the liquid, and each fluid is measured separately. A water-cut monitor is used to measure the amount of the water and the oil in the liquid phase. Two conventional single-phase flow meters are used to measure the gas and the liquid flow rates. This method can yield high accuracy, but require gas-separating devices which are either very large or are very sensitive to flow rates and the liquid's viscosity, surface tension, etc.

A second approach is described in U.S. Pat. Nos. 4,168,624 and 4,050,896, wherein the total flow is measured at two different flow conditions (for example: different temperatures and different pressures along the pipeline). The changing of the gas volume during the change of this condition makes it possible to calculate the flow rates of the gas and the liquid. To achieve high accuracy in this method, a large difference in flow conditions between the two flow meters is required. This requires a large pressure drop, which is costly in terms of pumping energy.

A third technique as described by Baker, "Measuring Multi-Phase Flow", Chemical Engineer, No 453, pp 39–45, October 1988, and Reimann et al, "Measurement of Two-Phase Mass Flow Rate: A Comparison of Different Techniques", Int J. of Multi-Phase Flows, Vol. 8, No. 1, pp. 33–46, 1982, measures the total momentum flux, total density, total volumetric flow rate, and the water cut. All are required to calculate the amount of gas, oil and water. One such device uses the combination of a turbine flow meter, a venturi flow meter, a gamma ray densitometer or void fraction meter and a water-cut monitor. The advantage of this method is that it enables the use of venturies which have low pressure drops. The weak link in this technique is the densitometer, which is sensitive to the flow characteristics and the fluid's contaminants (heavy metals, etc.).

In many multi-phase flow applications it is desirable to predict the pressure drops which will occur in various piping apparata with different combinations of multi-phase fluids. This information is critical to piping design, pump sizing, etc. While information has been compiled on the pressure drops of a two-phase fluid comprising of water and air, it has not been possible to predict the pressure drops for other, more unique multi-phase fluids.

SUMMARY OF THE INVENTION

Accordingly, one object of the invention is to provide a new and improved apparatus and method for measuring multiphase flow by means of simple, low cost, compact equipment which has high flow rate measuring accuracy.

Another object is to provide a novel apparatus and method for measuring multi-phase flow and which entails small pressure drops and therefore requires little pumping energy.

Yet a further object is to provide a novel apparatus and method as above noted, which does not need gas separating devices or densitometers or measurement of a void fraction to perform the flow measurement.

Still a further object of this invention is to provide a novel apparatus and method capable of developing a table predicting the pressure drops which will occur in piping apparata for different multi-phase fluids.

These and other objects are achieved according to the present invention by providing a novel apparatus for measuring the flow rates of each component of two-phase flow consisting of a gas and a liquid, including a first volumetric flow meter stage, second and third momentum flow meter stages coupled in a series flow path with the volumetric flow meter stage, wherein a velocity ratio between the gas and the liquid in the series flow path is maintained at a known value, e.g., one, and a processor for calculating flow rates of the components of flow by solving volumetric flow and momentum or energy equations defining flow through the first through third stages utilizing a volumetric flow output from the first stage and momentum flux outputs from said second and third stages, and an indicator for displaying flow rates of the liquid and gas components of the two-phase flow.

The second and third momentum flow meter stages can be implemented by two separate momentum flow meters or by a single momentum flow meter having a venturi nozzle including at least three pressure taps for obtaining at least two differential pressure measurements. In the event that the density of the liquid component is known, a single momentum flux measurement from a single momentum flow meter stage is sufficient to measure two-phase flow.

To measure three-phase (oil, water, gas) flow a water-cut meter is provided to determine the amount of water flow, which is then used by the processor to determine the amount of oil flow. The flow rates of oil, water and gas are then displayed.

To enable prediction of multi-phase fluid pressure drops in various flow apparata, a differential pressure measurement is taken across the first through third (and optionally fourth) stages, and means are provided to calculate and display ratios of the pressure drops of multi-phase fluids relative to the known pressure drops of fluids comprising water and air.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
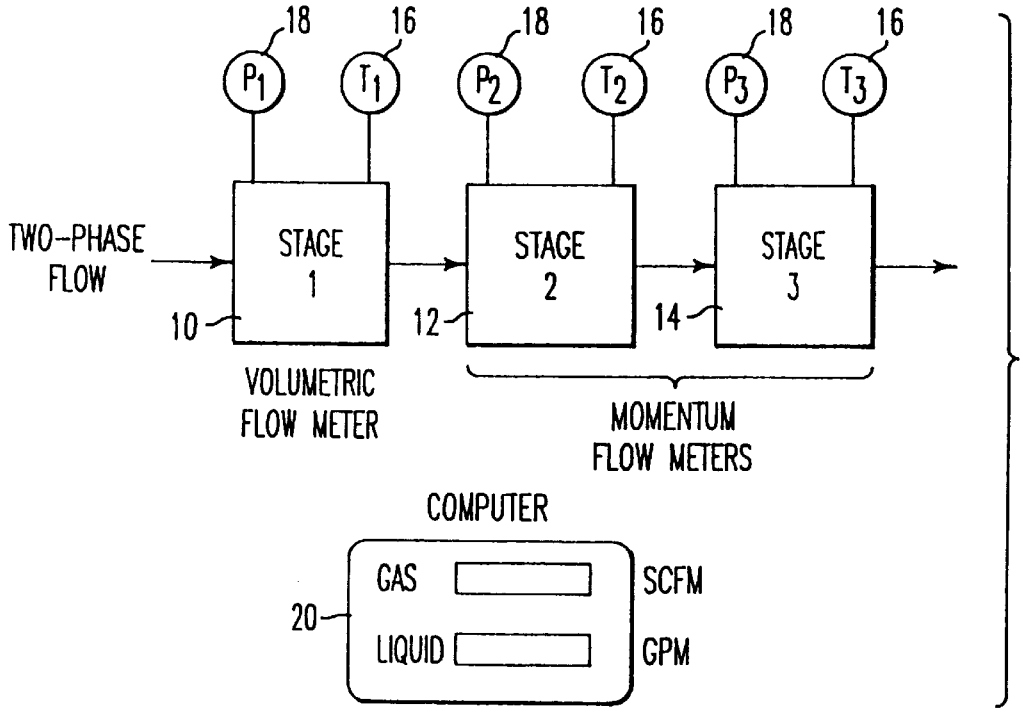
FIG. 1 is a block diagram of an apparatus for two-phase flow measurement according to the present invention.

Referring now to the drawings, wherein like reference numerals designate identical or corresponding parts throughout the several views, and more particularly to FIG. 1 thereof, there is shown schematically an embodiment of the apparatus of the invention, including a volumetric flowmeter 10 serving as a first stage in which a mixture of gas and liquid flows through the volumetric flow meter 10. This flow meter 10 measures the total flow rate for the mixture. The mixture then flows through second and third stages, consisting of two momentum flow meters 12 and 14 with different dimensions (for example, two venturi flow meters with different throat diameters). Momentum flow meters are flow meters that measure the momentum flux of the fluid (M=mv). In order to avoid using a void fraction meter, the present invention forces the velocity ratio between the gas and the liquid (slip ratio) inside the apparatus to be a known value, a slip ratio of one being conveniently enforced. This is achieved through using either static or dynamic mixers or a positive displacement meter. In each stage the absolute pressure and temperature are measured by means of temperature transducers 16 and pressure transducers 18. One momentum flow meter can also be used by itself, in the instance that the liquid component's density is known. The data from Stages 1, 2 and 3 is transferred to a computer 20 that calculates the flow rates of the liquid and the gas components by solving equations presented hereinafter.

Figure 2:
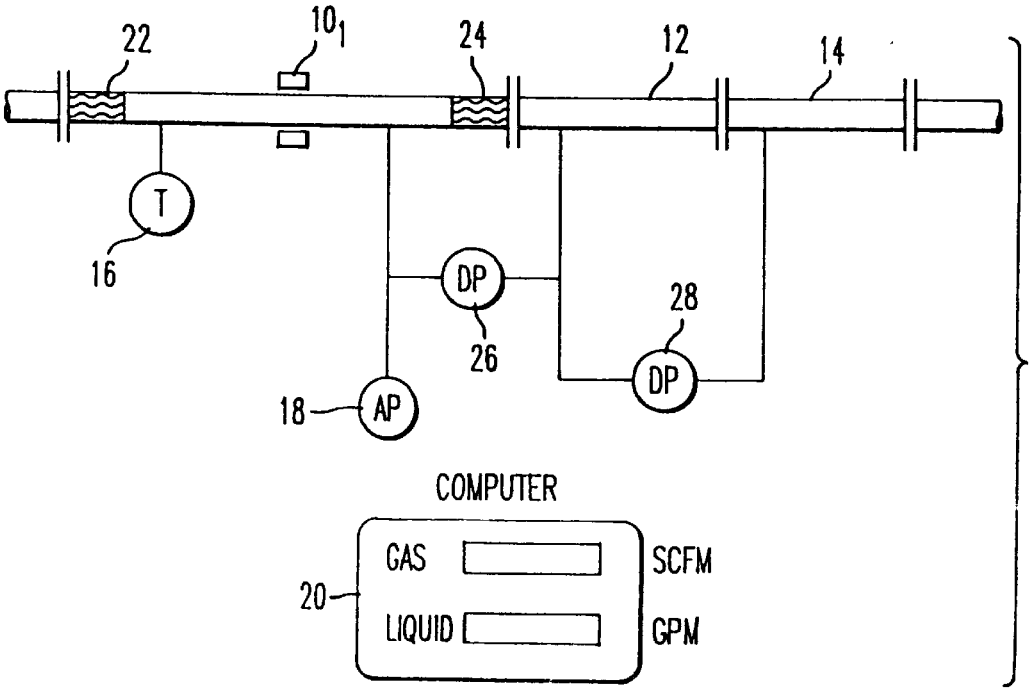
FIG. 2 is a schematic diagram of an apparatus for two-phase flow measurement according to the present invention, utilizing two venturi tubes and an ultra-sonic flow meter.

FIG. 2 shows an example of a more concrete embodiment of the invention for two-phase flow measurement. Stage 1 is an ultra-sonic flow meter $\mathbf{10}_1$ installed between two static mixers 22 and 24. The ultrasonic flow meter measures volumetric flow. Other volumetric flow meters can also be used, such as turbine, vortex shedding, magnetic, heat transfer, variable area, paddle and Coriolis volumetric flow meter. In this modification the static mixers 22, 24 are used to force a unitary velocity ratio between the phases. Instead of measuring the absolute pressure independently in each stage, the absolute pressure is measured with a pressure transducer 18 in stage 1, and is calculated using differential pressure transducers 26 and 28 in stages 2 and 3.

Figure 3:
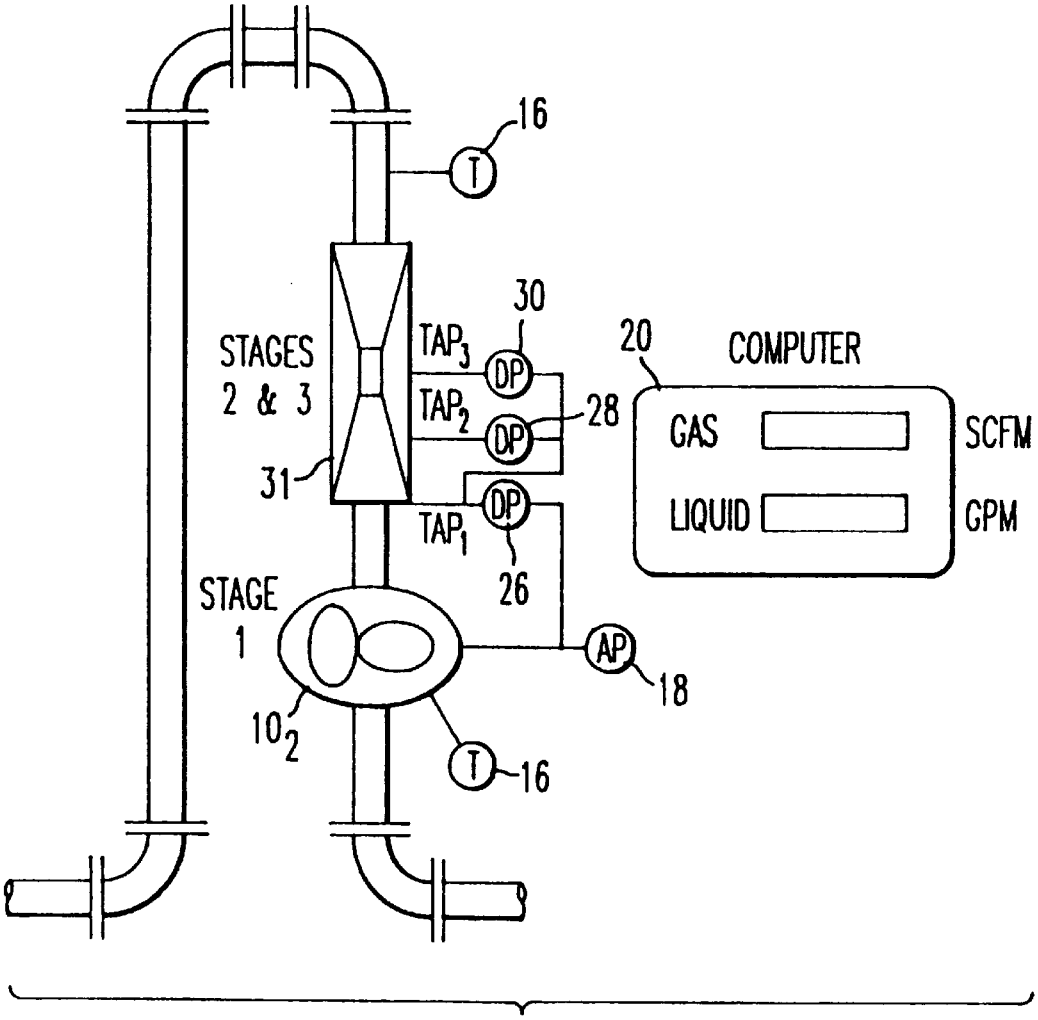
FIG. 3 is a schematic of a preferred embodiment for measuring two-phase flow, using a combination of a single modified venturi meter with a positive displacement flow meter.

The two momentum flow meters shown in FIGS. 1 and 2 can be reduced to one, by drilling one more pressure tap along the venturi nozzle, as shown in FIG. 3. Such a modified venturi flowmeter is designated by numeral 31 in FIG. 3. Here the volumetric flow meter $\mathbf{10}_2$ is a positive displacement (P.D.) type. The advantage of using a P.D. flow meter is that it provides an exact measurement of the sum of the liquid and gas flow rates, will no slip between the gas and liquid phases inside the meter or immediately after the meter. Thus, the P.D. flow meter forces the slip ratio to a known amount, i.e., unity, and permits dispensing with the static mixers of the FIG. 2 embodiment.

The embodiments shown in FIG. 1–3 are above-described using one or two venturi-type momentum flow meters. However, it should be understood that other momentum flow meters can be used to practice the present invention. For example, a target or drag-disk-type flow meter having different paddle dimensions can also be utilized to obtain sufficient parametric data to solve the energy and momentum equations of the fluids. For more detail about particular instrumentation described herein, see Hewitt, G. F., "Measurement of Two Phase Flow Parameters", Whitstable, Litho Ltd , Whitstable, Kent, Great Britain, 1978, and Holman, J. P., "Experimental Methods for Engineers", McGraw-Hill Book Company, 1978.

Figure 4:
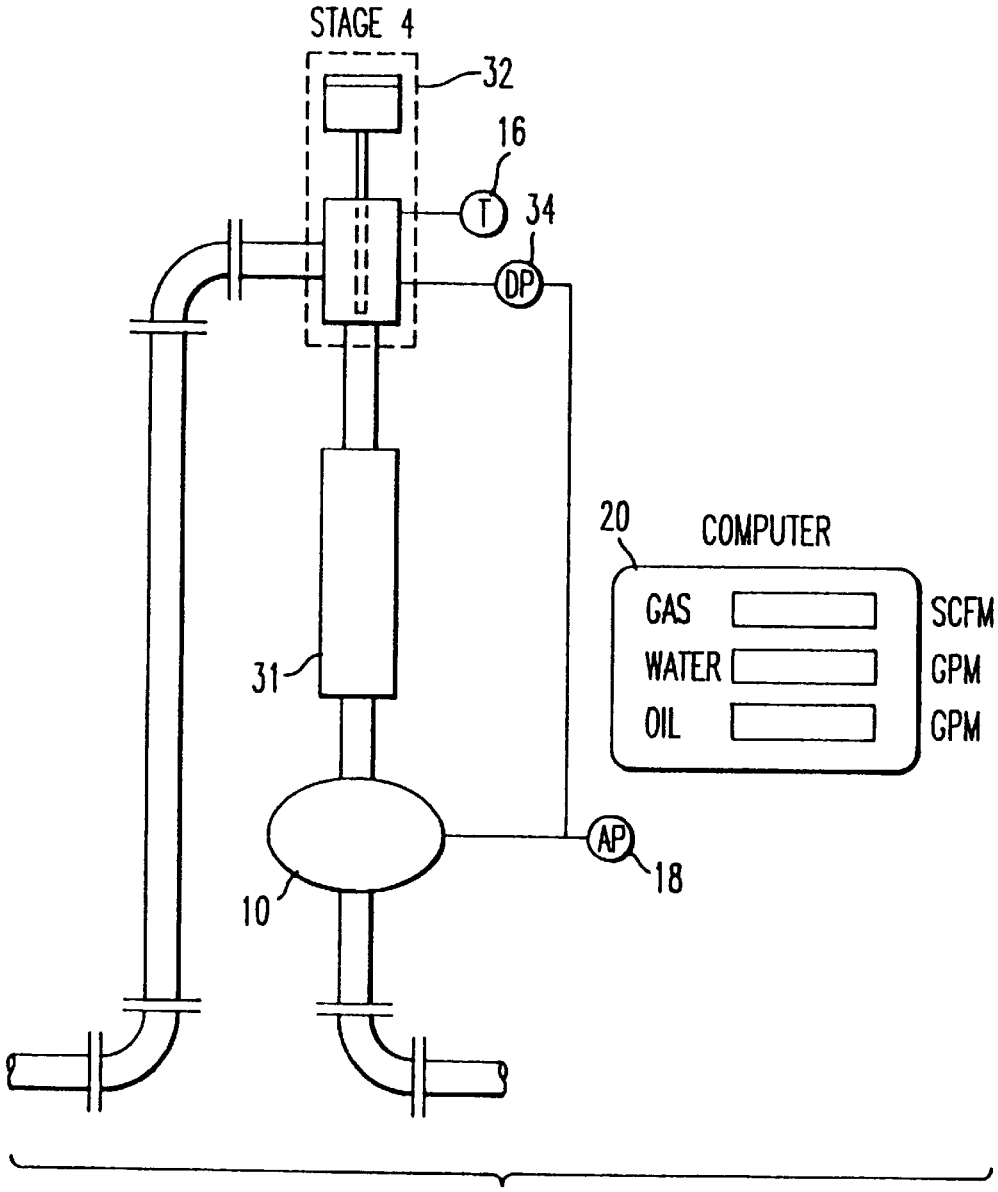
FIG. 4 is a schematic diagram of an embodiment of the present invention for three-phase flow with the flow meter shown in FIG. 3 and a water-cut monitor.

The differential pressure transducers 26 and 28 measure the pressure difference along the venturi nozzle. A three-phase flowmeter in which a mixture of oil, water and gas can be measured is constructed with the addition of a fourth stage water-cut meter. FIG. 4 shows a water-cut meter 32 (such as described in U.S. Pat. Nos. 4,503,383 and 4,771,680) that measures the water concentration c of the mixture. Absolute pressure and temperature are measured in this stage by transducers 16 and 34, respectively. Reference numeral 31 designates the modified venturi flowmeter having the pressure taps 1–3 and associated transducers shown in FIG. 3 in correspondence with stages 2 and 3 shown in FIG. 1. Because of the change in the specific volume of the gas (v=p/RT), measurement of the absolute pressure and temperature at all stages is necessary.

Next described is the analytical basis by which the present invention performs flow measurements utilizing momentum equations. In the following analysis, the following English and Greek letters and subscripts are used and have the noted meanings:

English letters

A—cross section
c—percent of water
d—longitude differential
g—gravity constant
m—total mass flux
M—momentum flux
p—pressure
P—circumference
Q—volumetric flow rate
R—gas constant
s—velocity ratio between the gas and the liquid ("slip")
T—absolute temperature
v—specific volume
x—quality Greek letters α—void fraction
B—slope of the instrumentation
ρ—density
τ—wall shear Subscripts G—gas
O—oil
PD—pointer displacement
TOTAL—sum of all the fluid components
TP—two-phase
W—water In performing a two-phase flow measurement, $Q_L$ and $Q_G$ are unknowns, but not the only unknowns.

The density of the liquid is also unknown (other unknown properties of the liquid and the gas have only a minor effect on the present method, and are therefore ignored here). The three equations that need to be solved for three unknowns are the following:

1) The volumetric flow meter equation for stage 1:

$$Q_{PD}=Q_L+Q_G \tag{1}$$

$Q_{PD}$ is derived from the volumetric flow meter output.

2) The momentum equation for stage 2 (for example the venturi meter shown in FIG. 3 from tap 1 to tap 2):

$$\rho_1-\rho=f_1(Q_L, Q_G, \rho_L) \tag{2}$$

where $\rho_1-\rho_2$ is the differential pressure derived from transducer 28 in FIG. 3.

3) The momentum equation for stage 3 (for example the venturi meter shown in FIG. 3 from tap 1 to tap 3):

$$\rho_1-\rho_3=f_2(Q_L, Q_G, \rho_L) \tag{3}$$

where $\rho_1-\rho_3$ is the differential pressure derived from transducer 30 in FIG. 3.

Certain assumptions must be made for the equations to be solvable:

1) The expansion of the gas along the venturi nozzle is isothermal.
2) Evaporation and dissolution of vapor and gas are negligible.
3) The ideal gas equation holds, and the liquid is incompressible.
4) The velocity ratio between the gas and the liquid=1, or can be found experimentally as a function of the liquid and the gas flow rates.

Equations 2 and 3, shown here in general form, are in fact integral equations derived from the full expression of the momentum equation (see Hetsroni, G., "Handbook of Multi-Phase Systems", Chaps 1.2, 2.1, 2.3, Hemisphere Publishing Corporation, U.S.A., 1982).

The momentum equation can be simplified to a model for one-dimensional, steady-state flow based on the Separated Two-Phase Flow model (see Hetsroni, G., supra) and can integrate from the first tap of the venturi to the second tap:

$$\rho_1-\rho_2=\int_1^2\left(g\rho_{TP}\sin\beta+\frac{\tau_2 P}{A}+m^2\frac{d}{dz}\left[\frac{(1-z)^2}{\rho_L(1-\alpha)}+\frac{z^2}{\rho_G\alpha}\right]\right)dz \tag{4}$$

and from the first tap of the venturi to the third tap:

$$\rho_1-\rho_3=\int_1^3\left(g\rho_{TP}\sin\beta+\frac{\tau_3 P}{A}+m^2\frac{d}{dz}\left[\frac{(1-z)^2}{\rho_L(1-\alpha)}+\frac{z^2}{\rho_G\alpha}\right]\right)dz \tag{5}$$

In equations 4 and 5 $\rho_{TP}$, m, x and $\alpha$ are functions of $Q_G$, $Q_L$ and $\rho_L$:

$$\rho_{TP}=(1-\alpha)\rho_L+\alpha\rho_\alpha \tag{6}$$

$$m=\frac{Q_L\rho_L+Q_G\rho_G}{A} \tag{7}$$

-continued $$\alpha=\frac{Q_G}{Q_G+zQ_L} \tag{8}$$

$$z=\frac{Q_G\rho_G}{Q_L\rho_L+Q_G\rho_G}$$

Substituting equations 6, 7, 8 and 9 into equations 4 and 5, and then solving with equation 1, provides solutions for $Q_L$, $Q_G$ and ρLsince we have three equations and three unknowns.

Equations 4 and 5 are solved using known numerical analysis techniques. The selection of a particular numerical analysis technique is based on a trade-off between accuracy and speed of execution, and is a function also of the availability of fast and economic computation devices. The relative merits of some techniques are discussed in Scheid, "Theory and Problems of Numerical Analysis", Schaum's Outline Series, McGraw-Hill Book Co., 1968. The technique most appropriate for equations 4 and 5, today, is the Runge-Kutta method described in Chapter 19 of Scheid, supra. It is anticipated, however, that the development of cheaper and faster computation devices, or more efficient or more accurate methods of solving integral equations, will suggest other techniques to be utilized in the future. Similarly, a method well suited for solving the set of equations 1, 4 and 5 is the Newton method described in Chapter 25 of Scheid.

More or less detailed, and different types of models can be written as well, depending on the required accuracy of the meter. Applying the momentum equations provides a much more accurate solution than the energy equations, since the momentum equations only have to take into account the friction on the wall (easy to estimate), as compared with the energy equations which have to take into account the energy losses (very difficult to estimate). Generally, it is considered that the present invention utilizes conservation equations, which can be either momentum or energy equations (see Hetsroni, supra).

The equation for deriving three-phase flow (oil/water/gas) by the addition of a water-cut meter in stage 4 is:

$$c=\frac{Q_W}{Q_W+Q_O+Q_G} \tag{10}$$

The liquid flow rate is the sum of the water and the oil flow rates:

$$Q_L, =Q_O+Q_W \tag{11}$$

Therefore, the equation for determining the water flow rate can be written as:

$$Q_W=(Q_L+Q_G)C \tag{12}$$

and then $Q_O$ can be derived from equation 12 once $Q_W$ is known.

Figure 5:
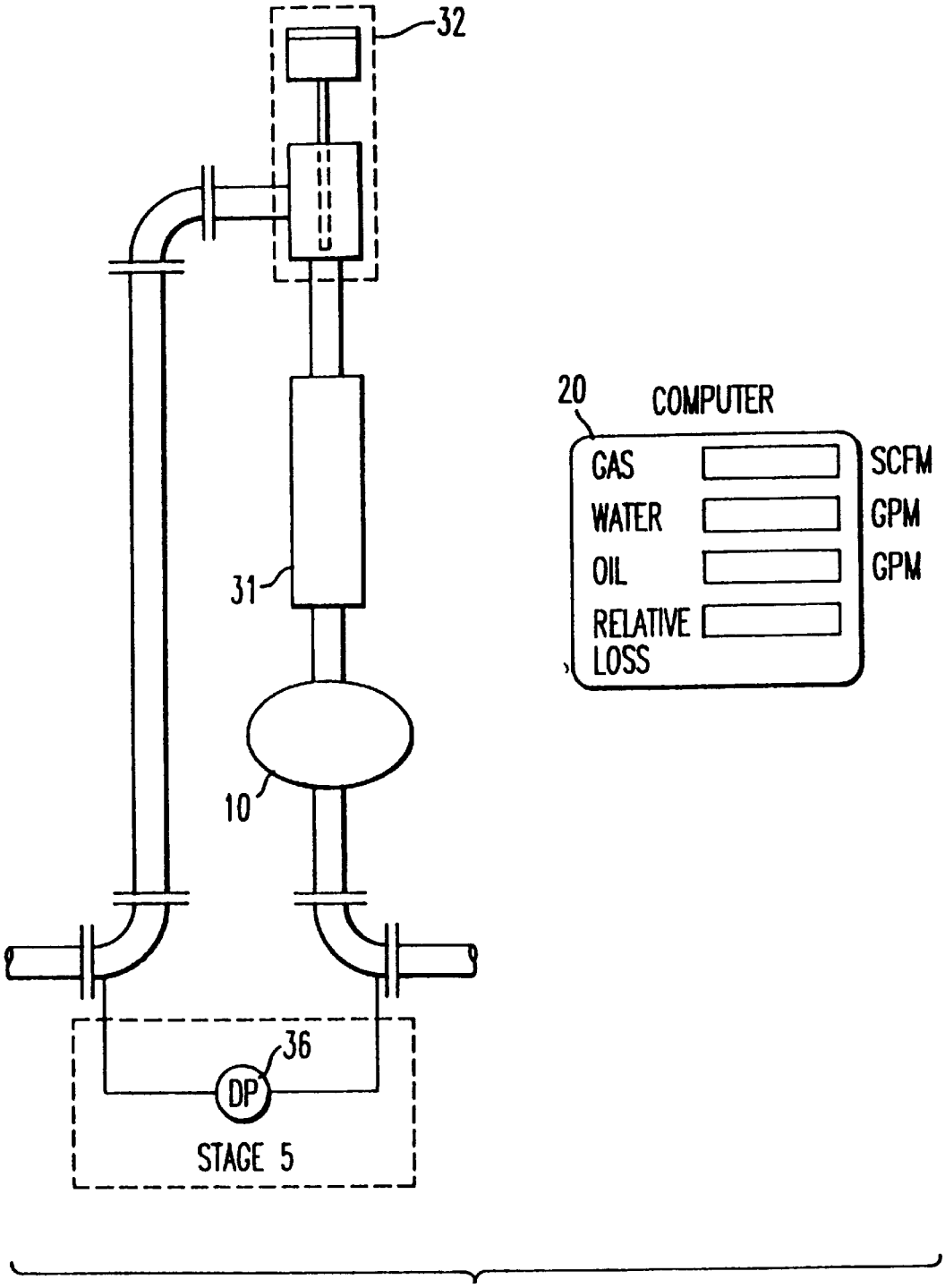
FIG. 5 is a schematic diagram illustrating how the flow meter shown in FIG. 4 can be used to measure the relative pressure drop of a three-phase fluid.

FIG. 5 shows how the multi-phase flow meter can also be used to predict pressure drops for different multi-phase fluids in different piping devices. The addition of differential pressure transducer (36) provides measurement of the pressure drop across the meter. In the calibration process a look-up table is generated, which contains the measured pressure drop across the meter when different proportions and rates of water and air are flowed through it. In effect the look-up table is a matrix of values of $\Delta P_{water/air}$ for different values of $Q_{air}$ and $Q_{water}$.

When a multi-phase fluid consisting of different components than water and air flows through the meter, stages 1, 2 and 3 measures $Q_G$ and $Q_L$, while stage 5 measures the differential pressure across the meter ($\Delta P_{fluid}$). The $\Delta P_{water/air}$ that corresponds to the equivalent air and water values for the measured $Q_G$ and $Q_L$ of the working fluid is then looked up in the above-noted look-up table, and the pressure drop ratio is calculated.

The equation for the pressure drop ratio of the working multi-phase fluid relative to an equivalent water/air mixture is:

$$\frac{\Delta p_{fluid}}{\Delta p_{water/air}} = \text{constl}_{\text{same for calculated air}} \tag{13}$$

Once this ratio has been calculated, it can be applied to obtain an accurate prediction of the pressure drop of multi-phase fluids in other devices in the line, where the pressure drop of an equivalent water/air mixture is known.

For example, to obtain the pressure drop in a vertical pipe in a field pipe line where crude oil, water and natural gas are flowing, a priori knowledge of the present drop for an air/water mixture in the same vertical pipe at the same flow rate is needed. This can be found in field handbooks (see Perry et al, "Chemical Engineer's Handbook", McGraw-Hill , Book Co., 1973, pp. 5.40–5.47). Multiplication of this number with the pressure drop ratio calculated according to the present invention provides an accurate prediction of the pressure drop across the vertical pipe for the working fluid.

Figure 6:
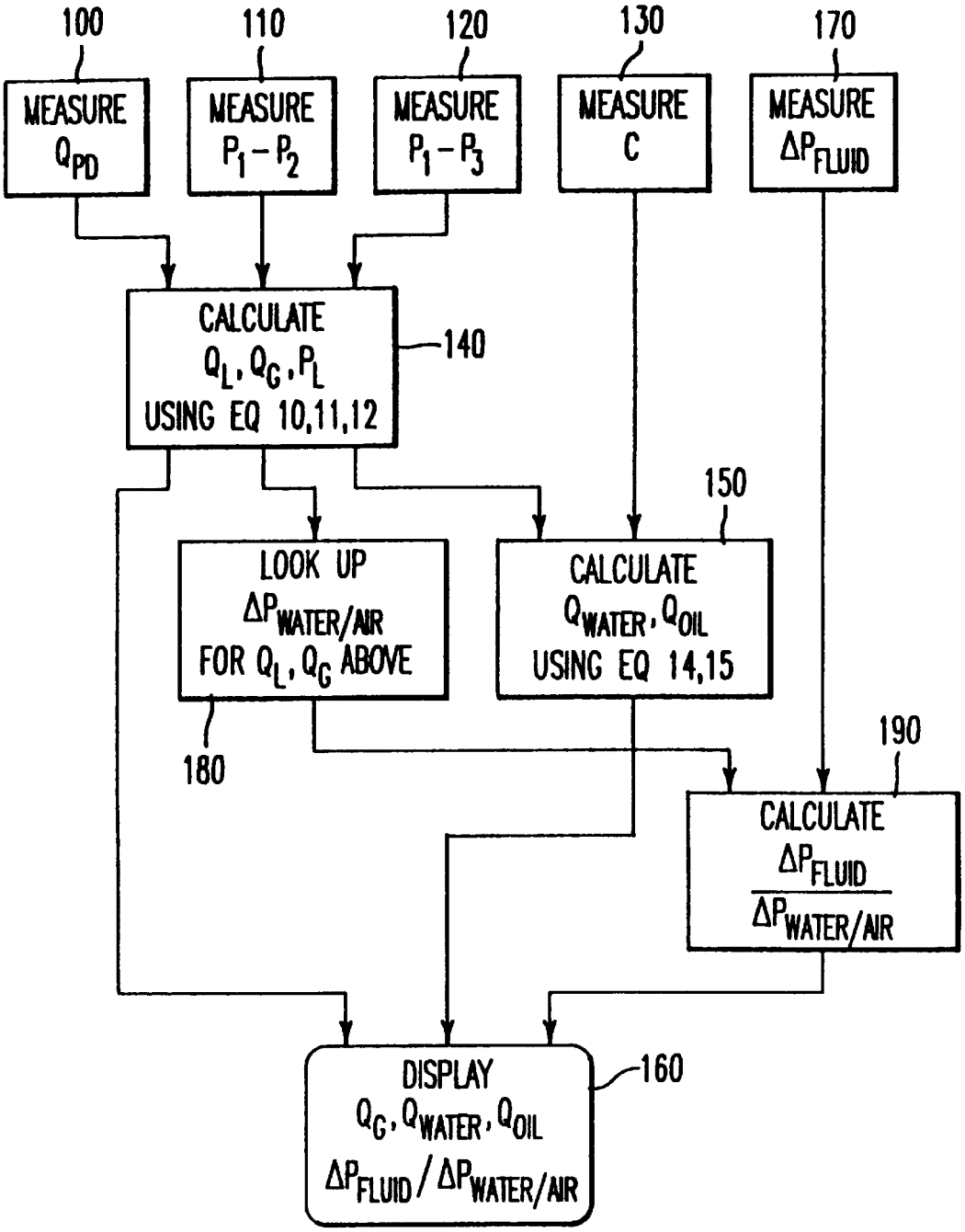
FIG. 6 is a flow chart of the overall process of the present invention for measuring three-phase flow and determining pressure drop ratios, according to the apparata described in relation to FIGS. 2–5.

FIG. 6 shows a flow chart that summarizes the process of the present invention.

In FIG. 6, in step 100, the output of the volumetric flow meter 10, $Q_{PD}$, is measured. In step 110, differential pressure, $\rho_1-\rho_2$, is measured. In step 120, the differential pressure $\rho_1-\rho_3$ is measured. In step 130, the water-cut, c, is measured. The outputs of the steps 100, 110, 120 and 130 are fed to the computer 20 which then calculates $Q_L$, $Q_G$ and $\rho_L$, solving equations 1, 4 and 5 and utilizing equations 6–9. In step 150, $Q_{water}$ and $Q_{oil}$ are calculated utilizing equations 10–12, and in step 160, the results of the various calculations performed as thus far described, $Q_G$, $Q_{water}$ and $Q_{oil}$ are displayed.

FIG. 6 also illustrates steps by which the ratio $\Delta P_{fluid}/\Delta P_{water/air}$ is determined. In step 170, $\Delta P_{fluid}$ is measured by means for the sensor 36 shown in FIG. 5. In step 180, a look-up table is utilized to determine $\Delta P_{water/air}$, based on the values of $Q_L$ and $Q_G$ determined in step 140. In step 190 the ratio of $\Delta P_{luid}$, determined in step 170 and $\Delta P_{water/air}$, determined in step 180, is determined and likewise displayed in step 160.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for measuring flow rates of gas and liquid components in a fluid flowing in a flow path, comprising:

*a.* volumetric flow meter [means for] *capable of* measuring a total flow rate for [said] *a* fluid and *further capable of* outputting a corresponding total flow rate signal;

*b.* first and second momentum flow [meter means] *meters* coupled in series in said flow path with said volumetric flow meter [means] for measuring the momentum flux of [said] *a* fluid and outputting respective first and second [momentum] signals *indicative of fluid momentum*; *and*

*c.* a processor [means] coupled to *receive signals output by* said volumetric flow meter [means] and said first and second momentum flow [meter means for] *meters, said processor capable of* determining the flow rate of a gas component and the flow rate of a liquid component [by solving predetermined equations for total flow and momentum or energy utilizing said total flow rate signal and said first and second momentum signals; and indicator means for displaying the determined flow rates of said liquid and gas components].

2. An apparatus according to claim 1, further comprising:

[means] *device* for forcing a known velocity ratio between said gas component and said liquid component in said flow path.

3. An apparatus according to claim 2, wherein said forcing [means] *device* comprises:

at least one of a static mixer or a dynamic mixer.

4. An apparatus according to claim 3, wherein said forcing [means] *device* comprises:

first and second mixers respectively coupled in series at an input and an output of said volumetric flow meter.

5. An apparatus according to claim 2, wherein said volumetric flow meter [means and said flow shaping means] comprise*s*:

a positive displacement flow meter.

6. An apparatus according to [claims 1, 2, 3, 4 or 5] *claim 1*, wherein said first and second momentum flow [meter means] *meters* comprise:

first and second venturi flow meters having different throat dimensions.

7. An apparatus according to claim[s] 1 [, 2, 3, 4 or 5,] wherein said first and second momentum flow meter means comprise:

a venturi flow meter having a *single* venturi nozzle including plural pressure measuring taps *connected to two or more pressure measuring devices*.

8. An apparatus according to claim 1, wherein said first and second momentum flow [meter means] *meters* comprise:

a drag-disk flow meter having different paddle dimensions.

9. An apparatus according to [claims 1, 2, 3, 4, or 5] *claim 1*, further comprising:

*a. a* water-cut meter [means] for measuring an amount of water in said liquid component and outputting a corresponding water-cut signal;

*b.* said processor [means comprising means for] *coupled to receive a signal output by said water-cut meter and capable of* determining flow rates of a gas constituent, a water constituent, and a further constituent of said liquid component based on said water-cut signal and the determined liquid and gas flow rates; and

*c.* [said] *an* indicator [means comprising means for] *capable of* displaying the determining flow rates of said water constituent and said further constituent.

10. An apparatus according to claim 6, further comprising:

*a. a* water-cut meter [means] for measuring an amount of water in said liquid component and outputting a corresponding water-cut signal;

*b.* said processor [means comprising means for] *coupled to receive a signal output by said water-cut meter and*

*capable of* determining flow rates of a gas constituent, a water constituent, and a further constituent of said liquid component in said fluid based on said water-cut signal and the determined liquid and gas flow rates; and

*c.* [said] *an* indicator [means comprising means for] *capable of* displaying the determined flow rates of said water constituent and said further constituent.

11. An apparatus according to claim 7, further comprising:

*a. a* water-cut meter [means] for measuring an amount of water in said liquid component and outputting a corresponding water-cut signal;

*b.* said processor [means comprising means for] *coupled to receive a signal output by said water-cut meter and capable of* determining flow rates of a gas constituent, a water constituent, and a further constituent of said liquid component in said fluid based on said water-cut signal and the determined liquid and gas flow rates; and

*c.* [said] *an* indicator [means comprising means for] *capable of* displaying the determined flow rates of said water constituent and said further constituent.

12. An apparatus according to claim 1, further comprising:

*a.* [means for] *a device capable of* measuring a pressure drop across the series flow path of said volumetric flow meter [means] and said first and second momentum flow [meter means] *meters* and producing a corresponding pressure drop signal;

*b.* memory [means] for storing a table of differential pressure drops as a function of plural values of air flow rate and water flow rate through said series flow path;

*c.* [means] *device* for selecting from said table stored in said memory [means] a corresponding differential pressure drop based on the measured gas and liquid flow rates;

*d.* [means] *device* for calculating a pressure drop ratio of said pressure drop signal and the selected differential pressure drop and outputting a corresponding pressure drop ratio signal; and

*e.* [means] *device* for multiplying said pressure drop ratio signal with a predetermined signal indicative of a pressure drop of an air/water mixture through a different flow path to determine a pressure drop of said fluid in said different flow path.

13. An apparatus for measuring flow rates of a gas component and a liquid component having a known density in a fluid flowing in a series flow path, comprising:

*a.* volumetric flow meter [means] for measuring a total flow rate for said fluid and outputting a corresponding total flow rate signal;

*b. a* momentum flow meter [means] coupled in series in said flow path with said volumetric flow meter [means] for measuring the momentum flux of said fluid and outputting a corresponding momentum signal;

*c.* processor [means] coupled to said volumetric flow meter [means] and said momentum flow meter [means] for determining the flow rate of said gas component and the flow rate of said liquid component by solving predetermined equations for total flow and momentum or energy utilizing said total flow rate signal and said momentum signal;

*d.* [means] *device* for measuring a pressure drop across the series flow path of said volumetric flow meter [means] and said momentum flow meter [means] and producing a corresponding pressure drop signal;

*e.* memory [means] for storing a table of differential pressure drops as a function of plural values of air flow rate and water flow rate through said series flow path;

*f.* [means]*device* for selecting from said table stored in said memory means a corresponding differential pressure drop based on the measured gas and liquid flow rates;

*g.* [means] *device* for calculating a pressure drop ratio of said pressure drop signal and the selected differential pressure drop and outputting a corresponding pressure drop ratio signal; and

*h.* [means] *device* for multiplying said pressure drop ratio signal with a predetermined signal indicative of a pressure drop of a known mixture through a different flow path to determine a pressure drop of said fluid in said different flow path.

14. An apparatus according to claim 13, further comprising:

[means] *device* for forcing a known velocity ratio between said gas component and said liquid component in said flow path.

15. An apparatus according to claim 14, wherein said forcing [means] *device* comprises:

first and second mixes respectively coupled in series at an input and an output of said volumetric flow meter.

16. An apparatus according to claim 14, wherein said volumetric flow meter [means] and said forcing [means] *device* comprise:

a positive displacement flow meter.

17. An apparatus according to claim 13, wherein said momentum flow meter [means] comprises:

a venturi flow meter.

18. An apparatus according to [claims 13, 14, 15 or 16] *claim 13*, further comprising:

*a. a* water-cut meter [means] for measuring an amount of water in said liquid component and outputting a corresponding water-cut signal;

*b.* said processor [means] comprising [means] *device* for determining flow rates of a gas constituent, a water constituent, and a further constituent of said liquid component based on said water-cut signal and the determined liquid and gas flow rates; and

*c.* [means] *device* for displaying the determined flow rates of said water constituent and said further constituent.

19. A method for measuring flow rates of gas and liquid components in a fluid flowing in a series flow path, comprising:

*a.* measuring a total flow rate in said flow path and outputting a corresponding total flow rate signal;

*b.* measuring the momentum flux of said fluid at first and second points in said series flow path and outputting respective first and second [momentum] signals *indicative of fluid momentum*;

*c.* determining the flow rate of said gas component and the flow rate of said liquid component [by solving predetermined equations for total flow and momentum or energy] utilizing said total flow rate signal and said first and second [momentum] signals[; and] *indicative of fluid momentum;*

[displaying the determined flow rates of said liquid and gas components].

20. A method according to claim 19, further comprising:

forcing a known velocity ratio between said gas component and said liquid component in said flow path.

21. A method according to [claims] *claim* 19 [or 20], further comprising:

*a.* measuring an amount of water in said liquid component and outputting a corresponding water-cut signal;

*b.* determining flow rates of a gas constituent, a water constituent, and a further constituent of said liquid component in said fluid based on said water-cut signal and the determined liquid and gas flow rates[; and displaying the determined flow rates of said water constituent and said further constituent].

22. A method according to claim 20, further comprising:

*a.* measuring a pressure drop across said series flow path and producing a corresponding pressure drop signal;

*b.* storing [a table of] differential pressure [drops] *drop data* as a function of plural values of said flow rate and water flow rate through said series flow path;

*c.* selecting from the stored [table] *data* a corresponding differential pressure drop based on the measured gas and liquid flow rates;

*d.* calculating a pressure drop ratio of said pressure drop signal and the selected differential pressure drop and outputting a corresponding pressure drop ratio signal; and

*e.* multiplying said pressure drop ratio signal with a predetermined signal indicative of a pressure drop of an air/water mixture through a different flow path to determine a pressure drop of said fluid in said different flow path.

23. A method of measuring flow rates of a gas component and a liquid component having a known density in a fluid flowing in a series flow path, comprising:

*a.* measuring a total flow rate in said flow path and outputting a corresponding total flow rate signal;

*b.* measuring the momentum flux of said fluid in said series flow path and outputting a corresponding [momentum] signal *indicative of fluid momentum*;

*c.* determining the flow rate of said gas component and the flow rate of said liquid component by solving predetermined equations for total flow and momentum or energy utilizing said total flow rate signal and said [momentum signals] *signal*;

*d.* measuring a pressure drop across said series flow path and producing a corresponding pressure drop signal;

*e.* storing [a table of] differential pressure [drops] *drop data* as a function of plural values of said flow rate and water flow rate through said series flow path;

*f.* selecting from the stored [table] *data* a corresponding differential pressure drop based on the measured gas and liquid flow rates;

*g.* calculating a pressure drop ratio of said pressure drop signal and the selected differential pressure drop and outputting a corresponding pressure drop ratio signal; and

*h.* multiplying said pressure drop signal with a predetermined signal indicative of a pressure drop of a known mixture through a different flow path to determine a pressure drop of said fluid in said different flow path.

24. A method according to claim 23, further comprising:

forcing a known velocity ratio between said gas component and said liquid component in said flow path to be one.

25. A method according to [claims] *claim* 23 [or 22], further comprising:

*a.* measuring an amount of water in said liquid component and outputting a corresponding water-cut signal;

*b.* determining flow rates of a gas constituent, a water constituent, and a further constituent of said liquid component in said fluid based on said water-cut signal and the determined liquid and gas flow rates; and

*c.* displaying the determined flow rates of said water constituent and said further constituent.

* * * * *

UNITED STATES PATENT AND TRADEMARK OFFICE

CERTIFICATE OF CORRECTION

PATENT NO. : Re. 36,597
DATED : March 7, 2000
INVENTOR(S) : Agar, et al.

It is certified that error appears in the above-indentified patent and that said Letters Patent is hereby corrected as shown below:

At column 5, line 17, replace "$\rho_1$ -$\rho$" with -- $P_1$- $P_2$ --.

At column 5, line 25, replace "$\rho_1$-$\rho_3$" with --$P_1$ - $P_3$ --.

At column 5, line 50, replace "$\rho_1$ - $\rho_2$" with --$P_1$ - $P_2$ --.

At column 5, lines 50 & 56, replace "$\rho_\tau p$" with -- $\rho_{TP}$ --.

At column 5,lines 50, replace "$\tau_2$" with -- $\tau$ --.

At column 5, line 56, replace "$\tau_3$" with -- $\tau$ --.

At column 5, line 56, replace "$\rho_1$ - $\rho_2$" with --$P_1$ - $P_3$ --.

At column 5, line 63, replace "$\rho_\tau p$" with --$\rho_{TP}$ --.

At column 5, line 63, replace "$\rho\propto$" with --$\rho_g$ --.

At column 7, line 35, replace "$\rho_1$ - $\rho_2$" with --$P_1$ - $P_2$ --.

At column 7, line 35, replace "$\rho_1$ - $\rho_3$" with --$P_1$ - $P_3$ --.

Signed and Sealed this

Tenth Day of April, 2001

*Attest:*

Nicholas P. Godici

NICHOLAS P. GODICI

*Attesting Officer*

*Acting Director of the United States Patent and Trademark Office*